United States Patent
White et al.

(10) Patent No.: US 10,467,593 B2
(45) Date of Patent: Nov. 5, 2019

(54) PROVIDING CONTEXTUAL COLLABORATION WITHIN ENTERPRISE APPLICATIONS

(75) Inventors: Robert A. White, Needham, MA (US); Brian C. Rowles, Acton, MA (US)

(73) Assignee: Oracle America, Inc., Redwood Shores, CA (US)

( * ) Notice: Subject to any disclaimer, the term of this patent is extended or adjusted under 35 U.S.C. 154(b) by 2604 days.

(21) Appl. No.: 11/117,909

(22) Filed: Apr. 29, 2005

(65) Prior Publication Data

US 2007/0226032 A1    Sep. 27, 2007

(51) Int. Cl.
*G06Q 10/10*    (2012.01)

(52) U.S. Cl.
CPC ........... *G06Q 10/101* (2013.01); *G06Q 10/10* (2013.01)

(58) Field of Classification Search
CPC .............................. G06Q 10/101; G06Q 10/10
See application file for complete search history.

(56) References Cited

U.S. PATENT DOCUMENTS

| | | | |
|---|---|---|---|
| 6,292,830 B1 * | 9/2001 | Taylor et al. | 709/224 |
| 6,804,330 B1 * | 10/2004 | Jones et al. | 379/88.01 |
| 7,035,825 B1 * | 4/2006 | Sturtevant et al. | 705/51 |
| 7,139,798 B2 * | 11/2006 | Zircher et al. | 709/204 |
| 7,366,460 B2 * | 4/2008 | O'Farrell et al. | 455/3.06 |
| 7,546,359 B2 * | 6/2009 | Tierney et al. | 709/223 |
| 8,019,632 B2 * | 9/2011 | Niheu et al. | 705/7.11 |
| 2002/0055956 A1 * | 5/2002 | Krasnoiarov et al. | 707/513 |
| 2002/0076025 A1 * | 6/2002 | Liversidge | G06Q 10/10 379/202.01 |
| 2002/0107994 A1 * | 8/2002 | Rickards, III | G06F 8/71 719/313 |
| 2002/0133392 A1 * | 9/2002 | Angel et al. | 705/10 |
| 2002/0133641 A1 * | 9/2002 | Royer | G06F 21/41 719/329 |
| 2002/0152210 A1 * | 10/2002 | Johnson et al. | 707/9 |
| 2002/0156812 A1 * | 10/2002 | Krasnoiarov et al. | 707/513 |
| 2002/0174097 A1 * | 11/2002 | Rusch et al. | 707/1 |
| 2003/0009536 A1 * | 1/2003 | Henderson et al. | 709/219 |
| 2003/0023677 A1 * | 1/2003 | Morison Zuill et al. | |
| 2003/0074418 A1 * | 4/2003 | Coker | |

(Continued)

OTHER PUBLICATIONS

NetworkWorld, The Buzz Issue; "Real-time collaboration-for rear!"; by Christine Perey; Sep. 29, 2003; p. 60.*

(Continued)

*Primary Examiner* — Carrie S Gilkey
(74) *Attorney, Agent, or Firm* — Sheppard Mullin Richter & Hampton LLP

(57) ABSTRACT

An enhanced enterprise system integrates enterprise application functionality of a conventional enterprise system and collaboration functionality of a conventional collaboration system to provide a centralized project or team space for managing and capturing the collaborative activity that is inherent in the enterprise application processes. For example, the enhanced enterprise system allows a user to access an enterprise application object and to create a shared team space for the enterprise application object. This causes the enhanced enterprise system to provision a collaborative site or team space within the integrated collaboration system, and associate the team space to the enterprise application object through which the team space was provisioned.

27 Claims, 8 Drawing Sheets

(56) References Cited

U.S. PATENT DOCUMENTS

| | | |
|---|---|---|
| 2003/0084127 A1* | 5/2003 | Budhiraja |
| 2003/0105887 A1* | 6/2003 | Cox |
| 2003/0135565 A1* | 7/2003 | Estrada .................. 709/206 |
| 2003/0140058 A1* | 7/2003 | Martin |
| 2003/0163357 A1* | 8/2003 | Engleman |
| 2003/0163547 A1* | 8/2003 | Beisty |
| 2003/0212654 A1* | 11/2003 | Harper |
| 2003/0217105 A1* | 11/2003 | Zircher ............ G06Q 10/10 709/205 |
| 2003/0236820 A1* | 12/2003 | Tierney |
| 2004/0015366 A1* | 1/2004 | Wiseman |
| 2004/0093397 A1* | 5/2004 | Chiroglazov et al. ........ 709/219 |
| 2004/0122696 A1* | 6/2004 | Beringer .......... G06F 17/30389 705/301 |
| 2004/0230652 A1* | 11/2004 | Estrada et al. ............. 709/204 |
| 2005/0060371 A1* | 3/2005 | Cohen et al. ............... 709/205 |
| 2006/0075024 A1* | 4/2006 | Zircher et al. ............. 709/205 |
| 2006/0095476 A1* | 5/2006 | Dauer |
| 2006/0206352 A1* | 9/2006 | Pulianda |
| 2007/0226032 A1* | 9/2007 | White |
| 2008/0148368 A1* | 6/2008 | Zurko |

OTHER PUBLICATIONS

NetworkWorld; "Collaborative software ages slowly"; by James Niccolai; Jan. 6, 2003; p. 23.*

Marke up US 20050060371 A1 (Choen), 2005.* www.infoworld.com; "Coming Together, Collaboration is gearing up with XML integration, peer-to-peer, and email delivery, as it tries to shift the balance toward user acceptance and ROI"; by Stephanie Sanbom and Cathleen Moore; Dec. 10, 2001; p. 36-38.* www.infoworld.com; "IM scales corporate ladder"; by Cathleen Moore; Jul. 16, 2001; p. 17-18.* www.infoworld.com; Create working offices on the Web; Web ; May 21, 2001; p. 80.*

Marked up Pub. No. US 2004/0093397 (Chiroglazov et al).*

\* cited by examiner

FIG. 8

Service Request: SR-42-4RN41
Home

Service Request
SR #: 146-8008129
Summary: Disk Failure
Description: Customer has had multiple disks crash on the Desktop Q systems.
Status: Open
Account: Envoy Corporation

802

Members
Online
- Anita Moorthy
- Brian Rowles
- Chris Mills
- Corinne Howard
- Robert White Not Online
- Anthony Deighton
- Bipin Chaudhari
- Gene Broadway
- Marcelo Vasquez
- Shaun Logan □ Add new member

804

Discussion
New Discussion | Expand/Collapse

| Subject | Replies | Posted By | Modified |
|---|---|---|---|
| There is more than one disk crashing, need help. | 2 | Robert White | 5/17/2004 3:58 PM |
| Please list all of the hardware and software components | 1 | Robert White | 5/17/2004 4:00 PM |
| We can replace these with the 570 line | 0 | Robert White | 5/17/2004 4:10 PM |
| RE: T220 Pro-Server sale on hold! NEW | 0 | Robert White | 5/18/2004 6:38 PM |

Documents
New Document | Upload Document | New Folder | Filter

| Type Name | Modified | Modified By | Checked Out To |
|---|---|---|---|
| Draft Customer Letter | 5/17/2004 4:13 PM | Robert White | Robert White |
| Hardware and Software Profile | 5/17/2004 4:02 PM | Robert White | |
| T140 Hard Drive Line | 5/17/2004 4:02 PM | Robert White | |

806

808

Tasks
New Item | Filter

| Title | Assigned To |
|---|---|
| Perform disk diagnostics on a sample of T140 drives | |

Team Calendar

PROVIDING CONTEXTUAL COLLABORATION WITHIN ENTERPRISE APPLICATIONS

TECHNICAL FIELD

The described technology is directed generally to computer applications and, more particularly, to providing contextual collaboration within enterprise applications.

BACKGROUND

Enterprise applications, such as customer relationship management (CRM applications, ase generally known. CRM is an approach to managing various aspects of interaction a company has with its customer, such as sales—or service—related interactions. The general aim of CRM is to assist the company in building lasting customer relationships and customer loyalty.

Given the competitive nature of most industries, many companies turn to CRM systems with the aim of improving customer satisfaction and maximizing profits. Many CRM systems available today provide both sales and service functionality, including account, contact, opportunity management, and call center capabilities such as case tracking and knowledge base. These CRM systems allow their users to enter information related to activities into a database so that the activities can be tracked in an attempt to resolve the activity in an automated fashion.

Examples of these activities include preparing for a sales meeting or demonstration, responding to a request for proposal (RFP), resolution of a complex service request, performing creative design for a marketing campaign, and the like. While the CRM systems provide for the logging of these tasks as activities with an assigned due date and status so that they may be tracked, the actual work to complete these activities is typically handled in unstructured communications conducted in meetings, over the phone, via email, etc.; typically these CRM systems do not provide their users the ability to conduct the communications that are required to complete the activities. Thus, what typically ends up happening is that, when an activity is initially identified, it is recorded in the CRM system so that the activity can be tracked. However, the actual work to complete the activity is conducted outside of the CRM system, since the CRM systems do not provide a platform for conducting the necessary communications. When the activity is completed, the user marks the activity as "completed" in the CRM system.

It would be desirable to have a CRM system that integrates the traditional tracking and management functionality of CRM with collaboration functionality in order to manage the unstructured collaborative activity that is commonly conducted in completing the activities.

BRIEF DESCRIPTION OF THE DRAWINGS

FIG. 8 is a display diagram showing a sample collaboration web page showing a CRM context.

DETAILED DESCRIPTION

Figure 1:
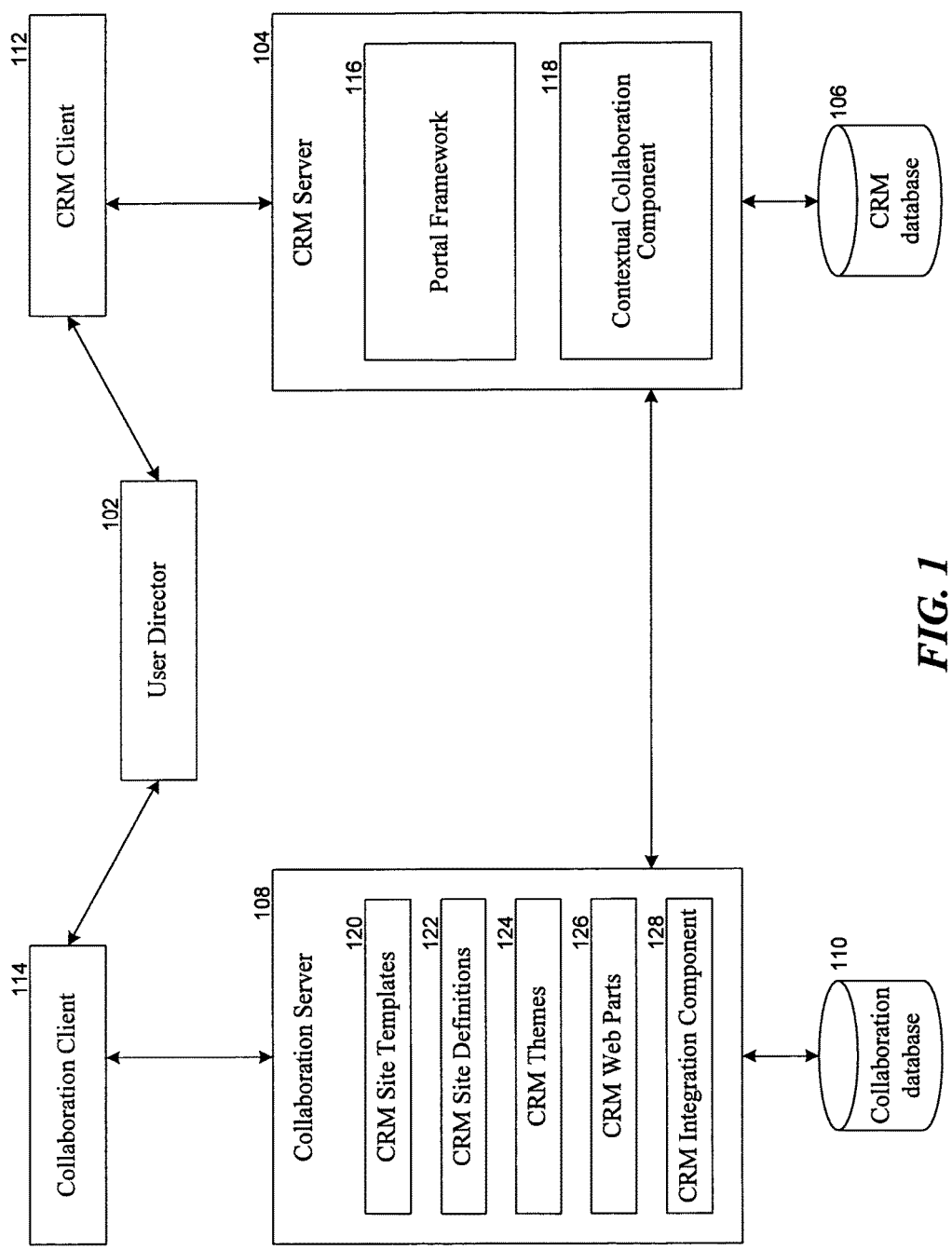
FIG. 1 is a block diagram illustrating selected components of a CRM system that provides collaboration functionality, according to some embodiments.

An approach to enhancing enterprise applications, such as customer relationship management (CRM) applications, to include collaboration functionality is provided. In some embodiments, an enhanced CRM system (herein after referred to as a "CRM system") integrates the features and functionality of a conventional CRM system, such as that developed and offered by Siebel Systems, Inc., of San Mateo, Calif., and the features and functionality of a conventional collaboration system, such as the Microsoft® SharePoint™ Services and SharePoint Portal Server, to provide a centralized project or team space for managing and capturing the collaborative activity that is inherent in the CRM processes.

For example, a user of the CRM system can use a CRM application to access an account, an opportunity, a service request, a marketing plan, a case management, or other objects in the CRM system, and "click" on a "Create Team Space" button that is provided on the CRM application's user interface (UI) to create a team space for the accessed CRM object. This causes the CRM system to provision a collaborative site or team space within the integrated collaboration system, and associate the team space to the CRM object through which the team space was provisioned. The terms "collaborative site" and "team space" are used interchangeably herein. In some embodiments, the CRM system initially "seeds" the team space with a default list of users, such as, by way of example, the account or service team members who are responsible for the CRM object. The created team space can then be used to host discussions and documents supporting the CRM object, as well as other collaborative activities provided by the collaboration system. The team space displays data that describes the context and state of the CRM object. The team space may provide access to other collaboration data, such as, by way of example, email, calendars, "ToDo" lists, etc. The team space is embedded within the CRM application UI to allow the CRM users to work within a familiar environment.

Once the team space has been created, a user with access to the CRM object may click on a "Collaborate" button that is provided on the CRM application's UI to access the team space associated with the CRM object. In some embodiments, the CRM system performs a security check to verify that the user is authorized to access the team space. For example, the CRM system can check to verify that the user that is logged into the CRM system is the same user that will be recognized by the collaboration system—e.g., is the same user that is logged into the operating system that is executing on the client computer that is being used by the user to access the CRM system. The CRM system may use any of a variety of well-known authentication techniques to ensure that the user that is logged into the CRM system is the same user that will be recognized by the collaboration system.

Once the security check is complete, the CRM system displays the team space embedded inside of the CRM application UI as additional data that is related to the CRM object. For example, the team space data, including access to the team space functionality, is provided as a part of the CRM application's UI.

The members of a provisioned team space may invite other users from, for example, the corporate directory, a partner, or customer into the team space. These invited users may have access to and familiarity with the CRM application or may be unfamiliar with the CRM application. Invited users who are non-CRM application users (i.e., somebody that is not using the CRM application) may receive a notification, such as an email message, with a link to the collaboration system site. The invited user can then click on the link in the email to be taken to—i.e., to access—the collaborative site or team space for the CRM object. The user may navigate directly to the collaboration site, which may be the same place that the user goes to participate in other collaborations, and navigate to the team space. The team space is accessible via both the CRM system and the collaboration system, which allows users, such as product managers, professional service team members, legal, and others, to easily interact in a collaborative forum that is familiar to the user and which is easy to use.

In some embodiments, the team space provides a discussion forum to enable all parties working on the CRM object to communicate using threaded discussions. Threaded discussions allow users to converse in a topic-response hierarchy. The CRM system can alert the users of new entries in the discussion threads via, for example, email alerts, and the users can associate attachments with the discussion threads. The discussion forum provides a platform to capture the unstructured conversations that are an everyday part of servicing the CRM object—e.g., managing and responding to customer requests. The discussion forum allows new participants to easily come up to speed by reviewing the discussion entries.

In some embodiments, the team space includes a document repository that is available to the members of the team space. The document library allows the documents to be versioned and checked in and out by members of the team. The CRM system can alert users of document updates via, for example, email alerts, and the users can form discussions around a specific document or documents. The document library provides an organized filing cabinet for work in process. The document library ensures that users have access to the most up-to-date information. By organizing documents in a single location, the entire team has access to the work and the work is preserved for future reference.

In some embodiments, the team space provides a members list that identifies the members of the team space—i.e., the people who are helping with the issue presented by the CRM object. The members list identifies all members of the team including the CRM application users—e.g., sales and service professionals—as well as the non-CRM application users—e.g., invited users from other departments. The members in the list may be displayed with an associated presence icon that indicates, for example, their status on the network. Available members can be invited into a chat session or Web conference. In some embodiments, the CRM system makes each user that is asked to participate on a CRM issue a part of the team. The team members can ask questions of other members and access the information that they need to be truly effective.

By facilitating the creation of a team space environment for managing opportunities, service issues, marketing campaigns, cases, and other CRM objects within the CRM system in this manner leads to better team work, improved communication, and reuse of information, which ultimately results in faster and more reliable customer response.

In the discussion that follows, various embodiments of the CRM system are further described in conjunction with a variety of illustrative examples. It will be appreciated that the embodiments of the CRM system may be used in circumstances that diverge significantly from these examples in various respects.

FIG. 1 is a block diagram illustrating selected components of a CRM system that provides collaboration functionality, according to some embodiments. As depicted, the CRM system comprises a user directory 102, a CRM server 104 coupled to a CRM database 106, and a collaboration server 108 coupled to a collaboration database 110. The CRM system also comprises a CRM client 112 shown coupled to the user directory and the CRM server, and a collaboration client 114 shown coupled to the user directory and the collaboration server. Only one CRM client and one collaboration client are shown in FIG. 1 for simplicity and one skilled in the art will appreciate that there may be a different number of CRM clients and/or collaboration clients.

The user directory is a repository of the users of the CRM server application and the collaboration server application, and is implemented as a shared Active Directory configuration. The user directory allows the collaboration server application to authenticate users in order to maintain a consistent mapping between a user in both the CRM and the integrated collaboration application.

The CRM server provides the CRM functionality—i.e., features and tools—for managing customer issues. In some embodiments, the CRM server comprises a portal framework 116 and a contextual collaboration component 118 to integrate with components of the collaboration server. The portal framework operates to render the collaborative content—i.e., the data regarding the team space—from the collaboration server within a CRM application to the CRM client. The contextual collaboration component exposes methods that are used to create and/or manipulate the team spaces in the collaboration server that are related to the CRM objects, and allows various components of the CRM server to utilize the contextual collaboration component to expose functionality within the CRM application UI. In some embodiments, the contextual collaboration component is implemented as a web service, and operates to dispatch calls to the CRM integration component of the collaboration server. The CRM integration component is further discussed below. The CRM database operates as a repository for the data associated with the CRM server.

The collaboration server provides the collaboration functionality—i.e., features and tools—for providing communities—e.g., teams or sites—for capturing and sharing ideas, information, communication, and documents. In some embodiments, the collaboration server comprises CRM site templates 120, CRM site definitions 122, CRM themes 124, CRM web parts 126, and a CRM integration component 128 to integrate with components of the CRM server.

The CRM site templates are metadata that describes the content and layout of team spaces in the collaboration server that are related to the CRM objects. In some embodiments, a CRM site template is created for each team space associated with a CRM object, and the template defines the web parts, layout, and theme for the CRM object. The CRM site definitions operate to render content, such as HTML content, within the collaboration application UI and the CRM application UI. In some embodiments, the CRM site definitions are implemented as a set of ASP.NET pages. The CRM themes are style sheets that are used during the rendering of the team spaces that are related to the CRM objects. In some embodiments, the CRM themes provide a CRM look and feel to the team space UI. The CRM web parts are the basic "building blocks" of the collaboration server pages, and operate to render discrete portions of the collaboration pages. The CRM web parts also operate to render the CRM server data within the collaboration application UI. In some embodiments, the CRM web parts communicate with the CRM server to retrieve the context and state of the CRM object associated with the team space.

The CRM integration component facilitates the creation and/or manipulation of team spaces in the collaboration server. For example, the CRM integration component exposes methods responsible for creating a team space associated with a CRM object. In some embodiments, the CRM integration component is implemented as a web service, which may be called from the contextual collaboration component of the CRM server. The collaboration database operates as a repository for the data associated with the collaboration server.

The CRM client and the collaboration client are clients may include any type of computing system that is suitable for executing the CRM application and the collaboration application that is used to access the CRM server and the collaboration server, respectively, as well as the user directory. In some embodiments, the CRM client and the collaboration client may be implemented as web browsers, thus allowing the features, functionality, and data provided by the CRM server and the collaboration server, respectively, to be downloaded and displayed to users of the CRM client and the collaboration client as web pages.

The aforementioned components of the CRM system are only illustrative and are not intended to suggest any limitation as to the implementation of the illustrated components and/or the scope of use or functionality of the facility. For example, in various embodiments, one or more depicted components of the collaboration server may be implemented as part of the CRM server. Moreover, the features of the collaboration server may be implemented as components of—i.e., as an integral part of—the CRM server. Furthermore, although not depicted in FIG. 1, some or all of the components of the CRM system may communicate with each other via a network, such as the Internet. One skilled in the art will appreciate that the various components of the CRM system may communicate with each other via networks other than the Internet, however.

The computer systems on which the CRM server, the collaboration server, the user directory, the clients, and various other components of the CRM system can execute may include a central processing unit, memory, input devices (e.g., keyboard and pointing devices), output devices (e.g., display devices), and storage devices (e.g., disk drives). The memory and storage devices are computer-readable media that may contain instructions that implement the server application, client application, and other components. In addition, the data structures and message structures may be stored or transmitted via a data transmission medium, such as a signal on a communications link. Various communication links may be used, such as the Internet, a local area network, a wide area network, a point-to-point dial-up connection, a cell phone network, and so on.

Embodiments of the CRM system may be implemented in various operating environments that include personal computers, server computers, computing devices, hand-held or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The CRM system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
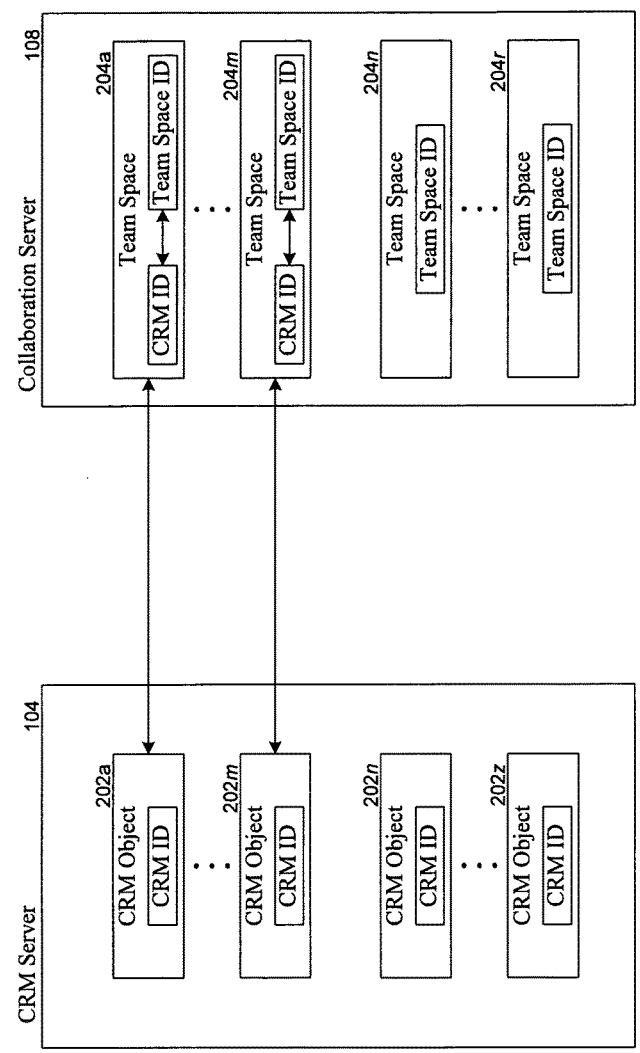
FIG. 2 is a block diagram illustrating the relationship between CRM objects in the CRM server and team spaces in the integrated collaboration server, according to some embodiments.

FIG. 2 is a block diagram illustrating the relationship between CRM objects in the CRM server and team spaces in the integrated collaboration server, according to some embodiments. By way of example, the CRM server is illustrated as comprising CRM objects 202a-202z, and the collaboration server is illustrated as comprising team spaces 204a-204r.

Each CRM object corresponds to an opportunity, such as a sales opportunity, service call, etc., that has been entered into the CRM system for management and tracking. A user can access the CRM system and enter an opportunity. In response, the CRM server creates the CRM object for the opportunity and uniquely identifies the CRM object with a CRM ID. For example, the CRM ID may be an identifier that identifies a record created in a database for the CRM object.

Each team space corresponds to a collaborative site within the collaboration server. A team space may be created from the CRM system. For example, a user can use the CRM client to connect to the CRM system and access a CRM object in the CRM server. The user can then request to create a team space for the accessed CRM object. In response, the CRM server transmits the CRM ID of the CRM object along with a request to create a team space to the collaboration server. Upon receiving the request, the collaboration server creates a team space and associates a team space ID that uniquely identifies the created team space with the received CRM ID. The collaboration server identifies the team spaces that were created by the CRM server as being created by the CRM server. For example, the collaboration server may use the CRM ID to indicate that the team space was created by the CRM server.

Alternatively, a team space may be created from the collaboration client. For example, a user can use the collaboration client to connect directly to the collaboration server and request to create a team space and, in response, the collaboration server can create the requested team space and uniquely identify the team space with a team space ID.

As depicted in FIG. 2, CRM objects 202a-202m in the CRM server each have corresponding team spaces 204a-204m, respectively, in the collaboration server, while CRM objects 202n-202z in the CRM server do not have corresponding team spaces in the collaboration server. In the collaboration server, team spaces 204a-204m were created by or from the CRM server and, as such, each of these team spaces is associated with a respective CRM object in the CRM server, while team spaces 204n-204r were created, for example, by users directly accessing the collaboration server and, thus, are not associated with any CRM objects.

The actual number of CRM objects depicted in the CRM server and the number of team spaces depicted in the collaboration server in FIG. 2 are only to illustrate the relationship or lack of a relationship between the CRM objects and the team spaces, and should not be interpreted as a limitation of the CRM server and/or the collaboration server, or a limitation of the number of CRM objects in the CRM server that may have an associated team space in the collaboration server.

Figure 3:
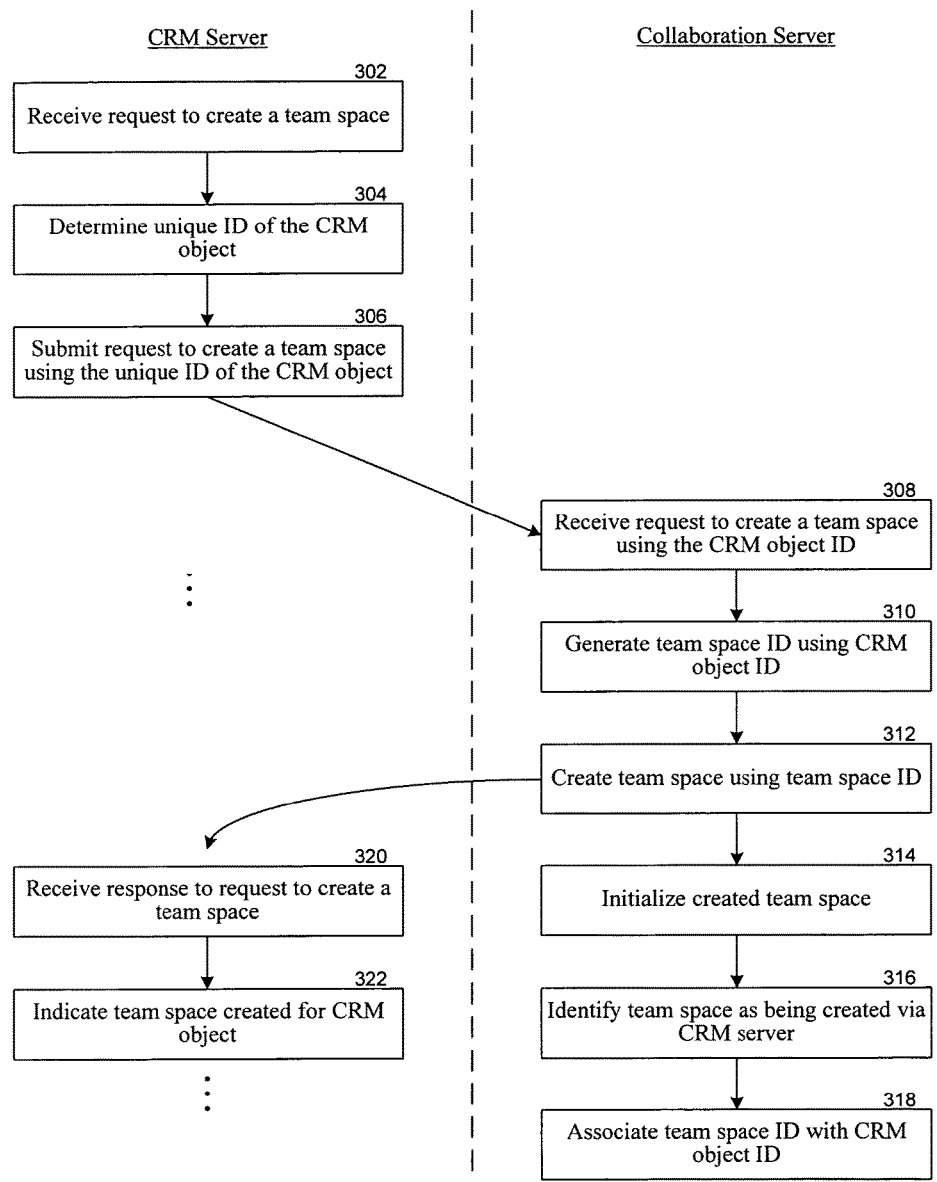
FIG. 3 is a flow diagram that illustrates the processing of a request to create a team space from within a CRM server, according to some embodiments.

FIG. 3 is a flow diagram that illustrates the processing of a request to create a team space from within a CRM server, according to some embodiments. By way of example, a user, such as a sales representative may have accessed the CRM system and created a CRM object for a sales opportunity. Realizing that the sales opportunity is a longer term project that will require input from many people in and outside the sales organization, the sales representative may access the CRM object for the sales opportunity and click on a button in the CRM application's UI to create a team space for the sales opportunity. In block 302, the CRM server component of the CRM system receives the request to create a team space for the CRM object. In block 304, the CRM server determines the unique ID of the CRM object that corresponds to the sales opportunity. In block 306, the CRM server submits to the collaboration server component of the CRM system a request to create a team space for the CRM object using the unique ID of the CRM object.

In block 308, the collaboration server receives the request to create a team space for the CRM object along with the unique ID of the CRM object. In block 310, the collaboration server generates a team space ID using the received ID of the CRM object. For example, the collaboration server may generate a Uniform Resource Locator (URL) for the team space that incorporates the ID of the CRM object. In block 312, the collaboration server creates a team space using the team space ID generated in block 310. In block 314, the collaboration server initializes the created team space with, for example, a list of users that are authorized to access the team space. For example, the collaboration server may receive the list of users from the CRM server. In block 316, the collaboration server identifies the team space as being created via the CRM server. In block 318, the collaboration server associates the team space ID with the ID of the CRM object. This serves as an indication that the team space has a corresponding CRM object in the CRM server.

Subsequent to successfully creating a team space, the collaboration server responds to the request from the CRM server to create the team space. In block 320, the CRM server receives the response to the request to create the team space from the collaboration server. In block 322, the CRM server identifies the CRM object as having a corresponding team space in the collaboration server. This serves as an indication that a team space has been created for the CRM object.

One skilled in the art will appreciate that, for this and other processes and methods disclosed herein, the functions performed in the processes and methods may be implemented in differing order. Furthermore, the outlined steps are only exemplary, and some of the steps may be optional, combined with fewer steps, or expanded into additional steps without detracting from the essence of the invention.

Figure 4:
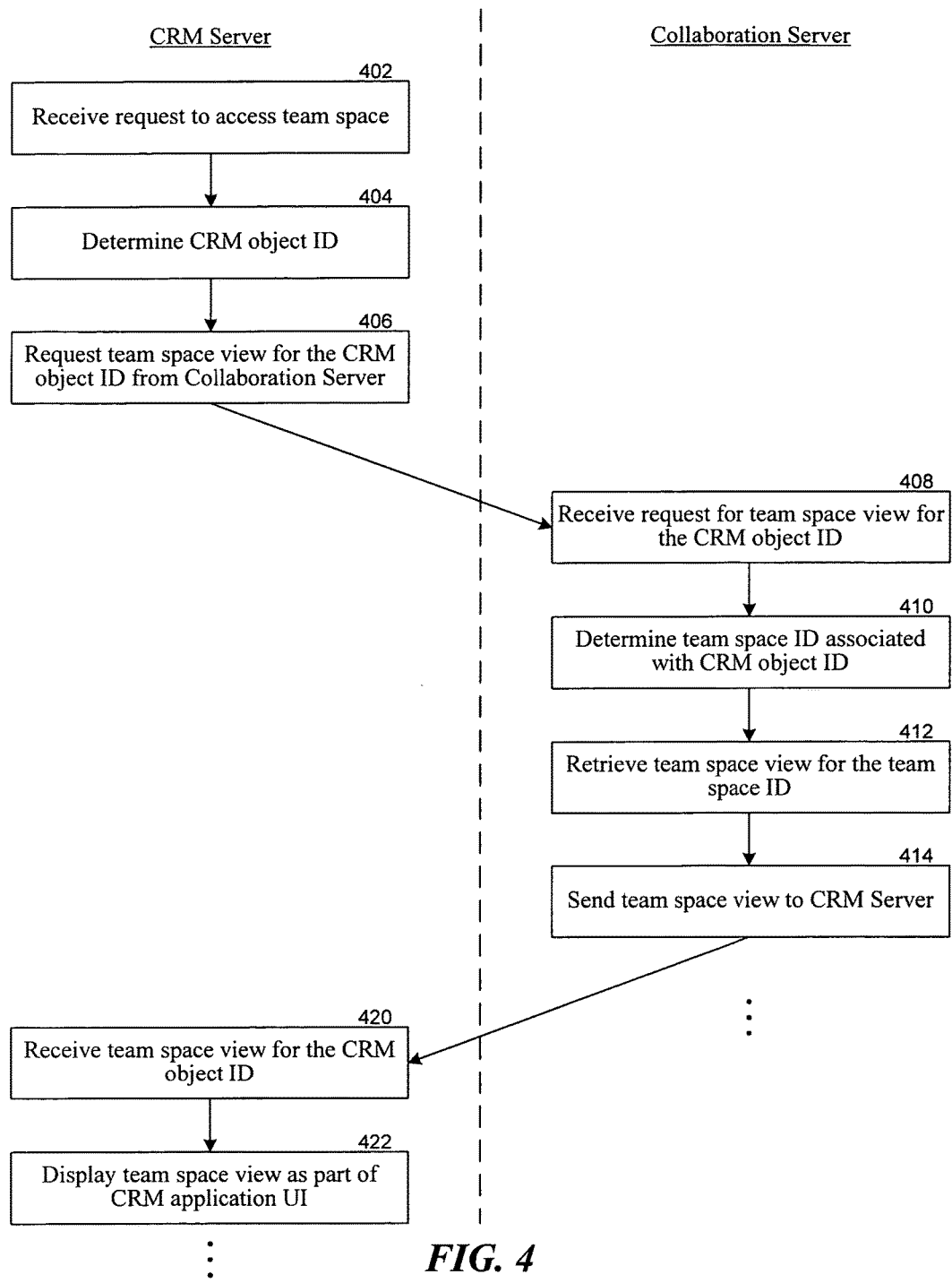
FIG. 4 is a flow diagram that illustrates the processing of a request to access a team space from within a CRM server, according to some embodiments.

FIG. 4 is a flow diagram that illustrates the processing of a request to access a team space from within a CRM server, according to some embodiments. Continuing the above example, wanting to check the team space for the sales opportunity to determine whether any new data was provided by the team members for the sales opportunity, the sales representative may access the CRM object for the sales opportunity and click on a button in the CRM application's UI to access the team space for the sales opportunity. In some embodiments, the button to access the team space provides a visual indication as to the existence and status of the team space. For example, the button may be displayed in a first color (e.g., green) if there is a team space related to the CRM object, may be displayed in a second color (e.g., gray) if no team space exists, and may be displayed in a third color (e.g., maroon) if a team space exists but has not been updated in a designated period of time.

In block 402, the CRM server component of the CRM system receives the request to access the team space. In block 404, the CRM server determines the unique ID of the CRM object (the CRM object ID) that was being currently accessed and to which the team space is related. In block 406, the CRM server requests from the collaboration server component of the CRM system a team space view for the CRM object ID. In block 408, the collaboration server receives the request for the team space view for the CRM object ID. In block 410, the collaboration server determines the team space ID that is associated with the CRM object ID. In block 412, the collaboration server retrieves the team space view for the team space ID, and sends the team space view to the CRM server in block 414. In block 416, the CRM server receives the team space view for the CRM object ID. In block 418, the CRM server displays the team space view as part of the CRM application UI. In some embodiments, the team space view is displayed in the bottom frame of the CRM application UI, and contains a custom web part for the display of the context and state of the CRM object, the members list, discussion thread, document library, task list, and team calendar.

Figure 5:
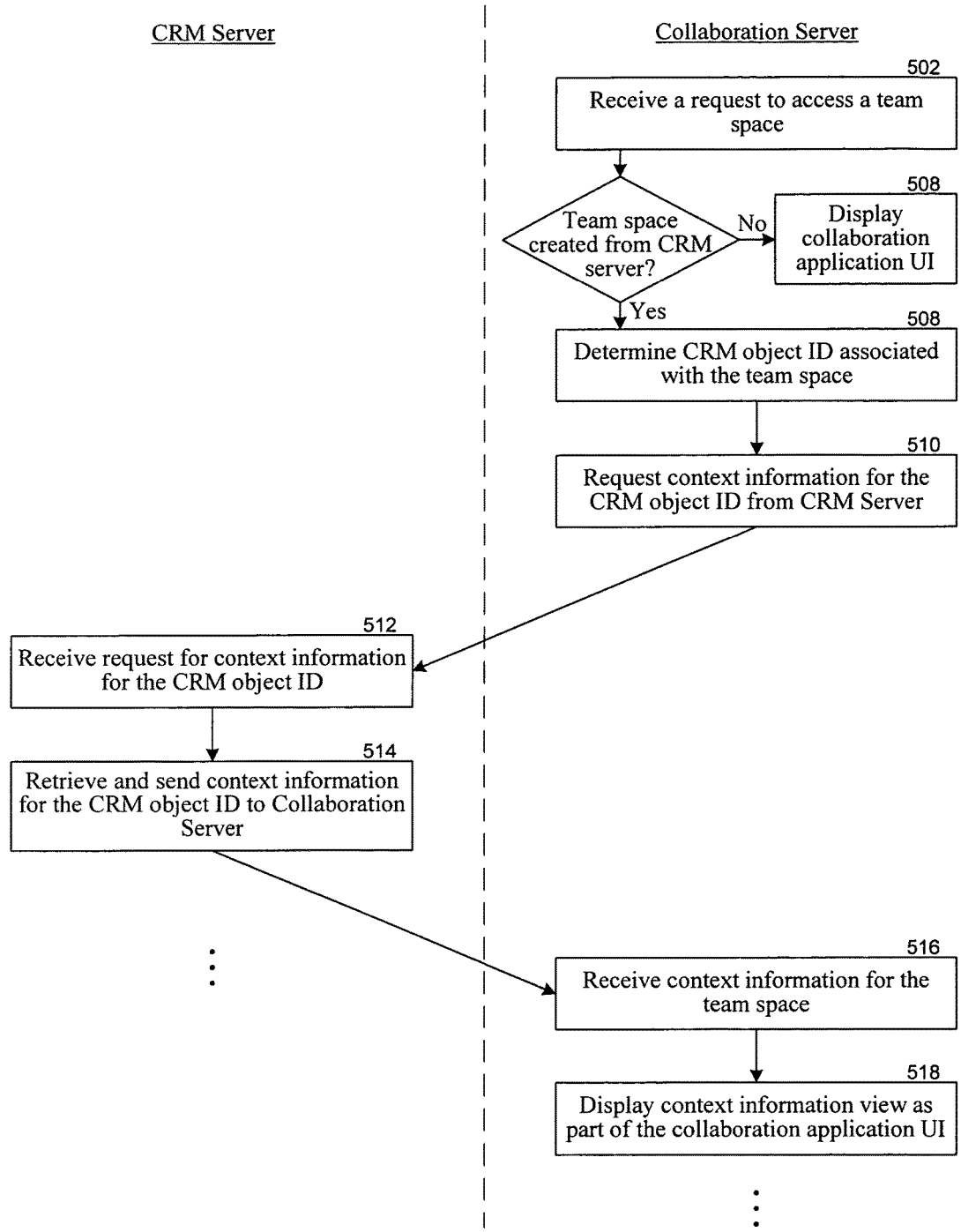
FIG. 5 is a flow diagram that illustrates the processing of a request to access a team space from within a collaboration server, according to some embodiments.

FIG. 5 is a flow diagram that illustrates the processing of a request to access a team space from within a collaboration server, according to some embodiments. Continuing the above example, a user, such as a product engineer, who is not a member of the sales organization and who does not have access to the CRM system, may have been authorized to access the team space in order to provide information necessary for properly responding to the sales opportunity. As a team member, the product engineer navigates to the collaboration server and the team space site (e.g., the product engineer was previously given information regarding the team space and how to access the team space), and through a provided collaboration application UI, the product engineer requests to access the team space for the sales opportunity.

In block 502, the collaboration server receives the request to access the team space. In block 504, the collaboration server checks to determine if the requested team space was created from the CRM server. If the requested team space was not created by the CRM server, then in block 506, the collaboration server displays a collaboration application UI that allows the access to the requested team space. In this instance, the collaboration server determines that the team space is not associated with any CRM object, and allows access through the collaboration application's standard UI.

If, in block 504, the collaboration server determines that the requested team space was created from the CRM server, then in block 508, the collaboration server determines the identifier of the CRM object that is associated with the requested team space. In block 510, the collaboration server sends the CRM server the identifier of the CRM object and requests the context information for the identified CRM object. In block 512, the CRM server receives the request for the context information for the identified CRM object, and in block 514, retrieves and sends to the collaboration server the context information for the identified CRM object. In block 516, the collaboration server receives the context information for the CRM object—i.e., the team space. In block 518, the collaboration server displays the context information as part of the collaboration application UI. In this manner, the collaboration server provides as part of its collaboration application UI a view of the context information corresponding to the team space that is associated with a CRM object.

Figure 6:
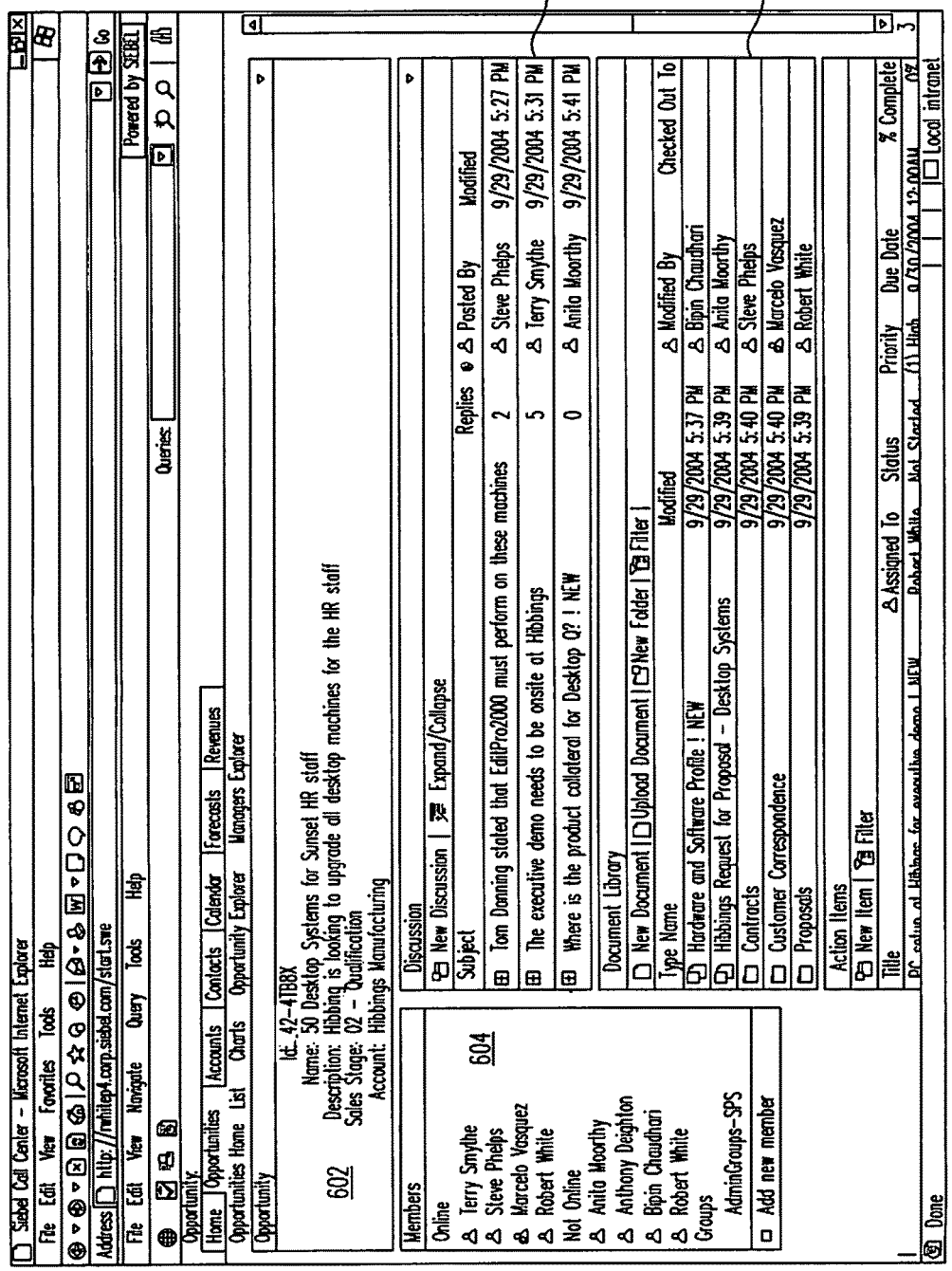
FIG. 6 is a display diagram showing a sample CRM web page through which a user accesses a team space.

FIG. 6 is a display diagram showing a sample CRM web page through which a user accesses a team space. The CRM web page is a CRM application UI that enables dynamic, cross functional teams to address—e.g., resolve, respond to, etc.—objects that have been entered into the CRM system. The CRM web page also allows new team members and managers to rapidly come up to speed and preserves the unstructured communications for search and reuse in addressing future CRM objects. As depicted, the CRM web page displays information for a sales opportunity entered in the CRM system, and shows a plurality of web parts for an opportunity 602, members 604, discussions 606, and documents 608. The opportunity web part communicates with the CRM server to retrieve and display information regarding the sales opportunity—i.e., the CRM object. The opportunity web part identifies the sales opportunity and displays the context and state information of the sales opportunity.

Figure 7:
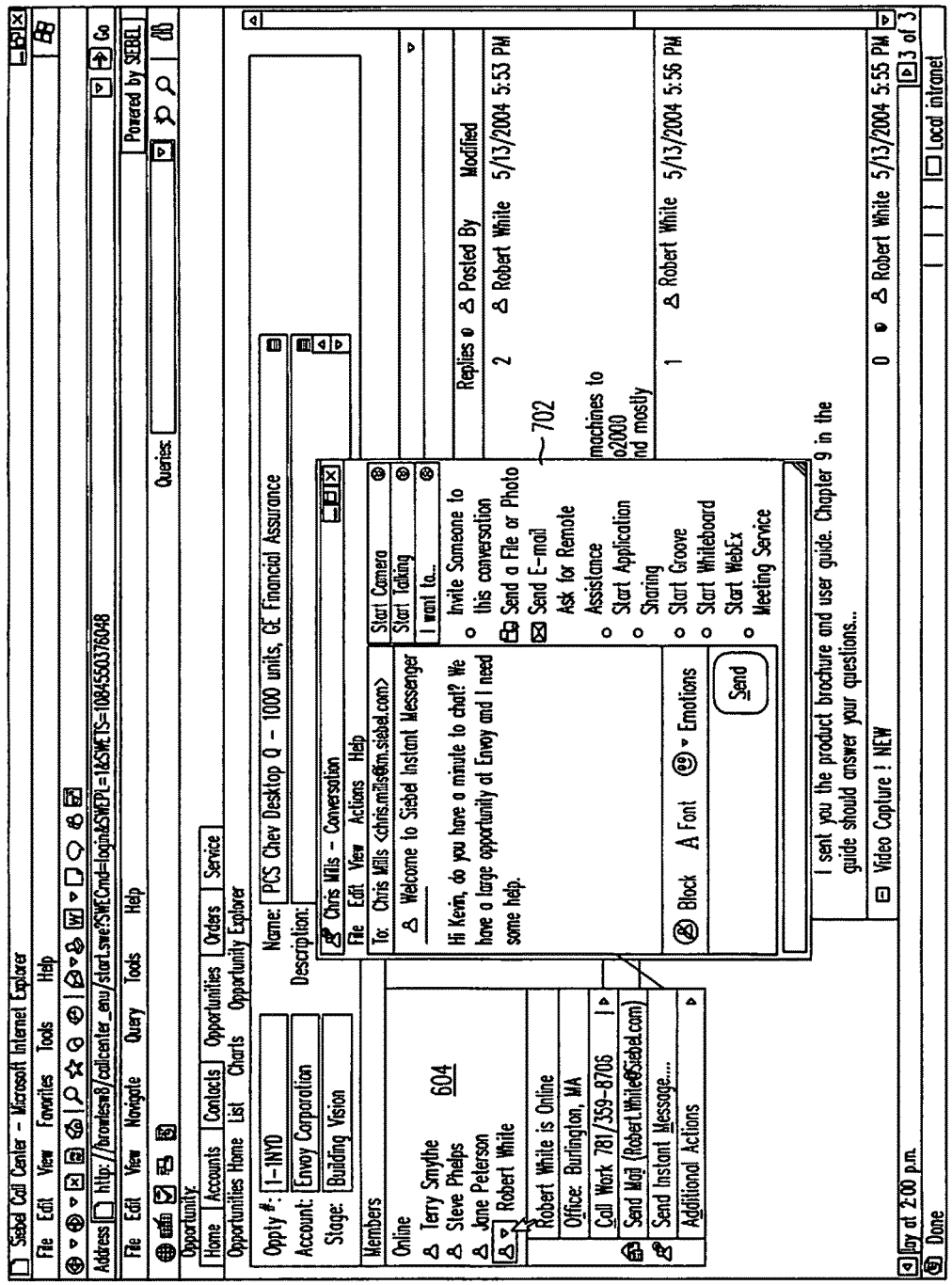
FIG. 7 is a display diagram showing a chat feature of the sample CRM web page.

The members web part communicates with the collaboration server to retrieve and display a list of team members that are participating in the sales opportunity. The members web part also allows users to invite new members into the project team. In some embodiments, the members web part displays the connection or presence status of each team member and allows users to access other team members via, for example, instant messaging. For example, the members web part indicates that Robert White is online and available for an instant messaging conversation. FIG. 7 is a display diagram showing a chat feature of the sample CRM web page. As illustrated, in response to a sequence of user inputs—i.e., selecting an individual in the members web part causes a context menu to be displayed, and selecting a feature in the displayed context menu causes a window for the selected feature to be displayed—the CRM web page displays a chat window 702 that allows the user to communicate with the team member selected in the members web part.

The discussions web part communicates with the collaboration server to display a list of the conversations associated with the sales opportunity organized into discussion threads. The discussions web part allows users to view the discussion threads, and access and participate in any of the listed discussion threads. In some embodiments, the discussion threads are preserved throughout the life of the sales opportunity—e.g., the sales cycle. New participants are able to determine who is working on the sales opportunity and can leverage the discussion forum to quickly come up to speed regarding the sales opportunity.

The documents web part communicates with the collaboration server to display a list of documents related to the sales opportunity. The documents web part organizes and versions the documents and allows the documents to be checked in and out by members of the team. In some embodiments, users can be alerted, for example, via email alerts, to document updates and can form discussions around a specific document.

FIG. 8 is a display diagram showing a sample collaboration web page showing a CRM context. The collaboration web page is a collaboration application UI that is accessed by users outside of the CRM environment—i.e., the users who do not have access to the CRM system and who directly access the collaboration server—to assist in responding to and/or addressing the CRM object. As depicted, the collaboration web page displays information for a service call entered in the CRM system, and shows a plurality of web parts for a service request 802, members 804, discussions 806, and documents 808. The service request web part communicates with the CRM server to retrieve and display information regarding the service call—i.e., the CRM object. The service request web part identifies the service call and displays summary data obtained from the CRM server describing the context and state of the service call. The members, discussions, and documents web parts are similar to the similarly named web parts discussed above in conjunction with FIG. 6, and similarly allows users to communicate and work on CRM object—i.e., service—issues in the same collaboration environment that the users are already comfortable with.

Even though the techniques for the integration of the collaboration features were described in the context of a CRM application, one skilled in the art will appreciate that the described techniques may be adapted to enhancing other enterprise applications, such as accounts payable (AP) applications, general ledger (GL) applications, inventory applications, etc., with integrated collaboration features to provide an enhanced enterprise application. For example, an enhanced AP system may allow a user to create an AP object (e.g., an AP account within the AP system) and request the AP system to create a team space for the AP object. In response, the enhanced AP system provisions a team space within the integrated collaboration system, and associates the team space to the AP object through which the team space was provisioned.

From the foregoing, it will be appreciated that embodiments of the invention have been described herein for purposes of illustration, but that various modifications may be made without deviating from the spirit and scope of the invention. Accordingly, the invention is not limited except in accordance with elements explicitly recited in the appended claims.

We claim:

1. A method in a computing system comprising:
   creating a plurality of customer relationship management (CRM) objects, using one or more processors of the computing system, wherein
      the plurality of CRM objects is created by a CRM server, and
      each of the CRM objects represents a business activity of a plurality of business activities;
   managing the plurality of CRM objects, wherein
      the managing is performed by the CRM server,
      the CRM server is executed by the one or more processors, and
      the managing comprises providing access to a CRM object of the plurality of CRM objects;
   sending a request to create a team space for managing and capturing collaborative activity associated with the CRM object in a context of the business activity, wherein
      the request is sent to a collaboration server using a web service integrating the CRM server and the collaboration server,
      a team space identifier is created in the context as a result of being associated with the CRM object,
      the team space for the CRM object is created and provided by the collaboration server, wherein the collaboration server generates a team space identifier that identifies the team space, wherein the team space identifier incorporates a CRM identifier that identifies a record created in a database for the CRM object, and wherein the CRM identifier is generated by the CRM server for the CRM object, the team space is accessible by a user interface associated with the CRM server, a view of the team space rendered in the user interface by the collaboration server according to a CRM site template stored in a database associated with the collaboration server, the creating the team space comprises obtaining state information from the CRM object, the state information is used in creation of the team space, and the team space provides a list of users associated with the team space, one or more electronic communication channels between users in the list of users, a document repository for storing documents created by one or more users in the list of users, and a discussion forum including items created by the one or more users in the list of users;

enabling a security check to be performed to verify user authorization for accessing the team space, the enabling comprising:

determining that the user is not included in a first list of users authorized to access the CRM object at the CRM server;

determining that the user is included in a second list of users authorized to access the team space at the collaboration server;

receive a request to access the team space from the collaboration server, the team space being associated with the CRM object at the CRM server; and request the team space from the collaboration server using the CRM identifier, the view of the team space being provided to the CRM server by the collaboration server, wherein the team space displays data that describes at least one of the context or the state information corresponding to the CRM object.

2. The method of claim 1, further comprising:
initializing the team space with the state information, wherein
the state information comprises
a list of users authorized to access the team space.

3. The method of claim 1, further comprising:
presenting the user interface, wherein
the user interface is presented on a display of the computing system, and
the user interface is configured to provide a user with access to the team space.

4. The method of claim 1, further comprising:
presenting the user interface, wherein
the user interface is configured to provide access to a collaboration server web service of the collaboration server,
the user interface is configured to provide access to the team space,
the user interface is configured to provide a visual indication that provides a status of the team space, wherein the visual indication indicates that the team space related to the CRM object has not been updated in a designated period of time, and
the user interface is configured to display information regarding the CRM object by virtue of being configured to provide access to the team space associated with the CRM object.

5. The method of claim 4, wherein
the team space is accessible via the CRM server and the collaboration server.

6. The method of claim 1, wherein
the team space is configured to provide collaborative access to at least one collaboration service of a plurality of collaboration services.

7. The method of claim 6, wherein
the plurality of collaboration services are provided by the collaboration server, and
the collaboration server is configured to support a CRM integration web service.

8. The method of claim 7, wherein
the CRM integration web service is configured to facilitate integration of the state information into the team space upon creation of the team space.

9. The method of claim 7, wherein
the association between the business activity and the team space is provided by the CRM integration web service.

10. The method of claim 1, wherein
the CRM object is identified by the CRM identifier,
the team space is identified by the team space identifier, and
the CRM object and the team space are associated with one another by virtue of an association between the CRM identifier and the team space identifier.

11. The method of claim 1, wherein
the business activity is a CRM activity,
the context is a CRM context, and
the CRM activity is one of
a customer account,
a sales opportunity,
a service request,
a marketing plan, or
a case management plan for a case.

12. A non-transitory computer-readable storage medium storing computer instructions, wherein the computer instructions are configured to cause one or more processors of a computer system to:

create a plurality of customer relationship management (CRM) objects, using the one or more processors, wherein
the plurality of CRM objects is created by a CRM server, and
each of the CRM objects represents a business activity of a plurality of business activities;

manage the plurality of CRM objects, wherein
the managing is performed by the CRM server,
the CRM server is executed by the one or more processors, and
the computer instructions configured to manage the plurality of CRM objects further comprise computer instructions configured to provide access to a CRM object of the plurality of CRM objects;

send a request to create a team space for managing and capturing collaborative activity associated with the CRM object in a context of the business activity, wherein
the request is sent to a collaboration server using a web service integrating the CRM server and the collaboration server,
a team space identifier is created in the context as a result of being associated with the CRM object,
the team space for the CRM object is created and provided by the collaboration server, wherein the collaboration server generates a team space identifier that identifies the team space, wherein the team space identifier incorporates a CRM identifier that identifies a record created in a database for the CRM object, and wherein the CRM identifier is generated by the CRM server for the CRM object, the team space is accessible by a user interface associated with the CRM server, a view of the team space rendered in the user interface by the collaboration server according to a CRM site template stored in a database associated with the collaboration server, the computer instructions configured to create the team space further comprise computer instructions configured to obtain state information from the CRM object, the state information is used in creating the team space, and the team space provides a list of users associated with the team space, one or more electronic communication channels between users in the list of users, a document repository for storing documents created by one or more users in the list of users, and a discussion forum including items created by the one or more users in the list of users;

enable a security check to be performed to verify user authorization for accessing the team space, the enabling comprising:

determining that the user is not included in a first list of users authorized to access the CRM object at the CRM server;

determining that the user is included in a second list of users authorized to access the team space at the collaboration server;

receive a request to access the team space from the collaboration server, the team space being associated with the CRM object at the CRM server; and request the team space from the collaboration server using the CRM identifier, the view of the team space being provided to the CRM server by the collaboration server, wherein the team space displays data that describes at least one of the context or the state information corresponding to the CRM object.

13. The non-transitory computer-readable storage medium of claim 12, wherein the computer instructions are further configured to cause the one or more processors to:

initialize the team space with the state information, wherein the state information comprises a list of users authorized to access the team space.

14. The non-transitory computer-readable storage medium of claim 12, wherein the computer instructions are further configured to cause the one or more processors to:

present the user interface, wherein the user interface is configured to be presented on a display of the computer system, and the user interface is configured to provide a user with access to the team space.

15. The non-transitory computer-readable storage medium of claim 14, wherein the user interface is configured to allow the user to invite another user into the team space.

16. The non-transitory computer-readable medium of claim 12, wherein the user interface allows communication between a first user and a second user in the team space, and the communication is initialized using the state information.

17. The non-transitory computer-readable storage medium of claim 12, wherein the CRM object is configured to be accessed via a CRM object user interface, a collaboration server web service provides a collaboration server user interface through which a user can access the team space, the collaboration server user interface and the CRM object user interface are independently accessible from one another, and the collaboration server user interface is configured to display information regarding the CRM object.

18. The non-transitory computer-readable storage medium of claim 12, further comprising computer instructions configured to cause the one or more processors to:

present the user interface, wherein the user interface is configured to provide access to a collaboration server web service of the collaboration server, provide access to the team space, and display information regarding the CRM object by virtue of being configured to provide access to the team space associated with the CRM object.

19. The non-transitory computer-readable storage medium of claim 18, wherein the team space is accessible via the CRM server and the collaboration server.

20. The non-transitory computer-readable storage medium of claim 12, wherein the team space is configured to provide collaborative access to at least one collaboration service of a plurality of collaboration services.

21. The non-transitory computer-readable storage medium of claim 20, wherein the plurality of collaboration services are provided by the collaboration server, the collaboration server is configured to support a CRM integration web service, and the CRM integration web service is configured to facilitate integration of the state information into the team space upon creation of the team space.

22. The non-transitory computer-readable storage medium of claim 20, wherein the association between the business activity and the team space is provided by the CRM object.

23. The non-transitory computer-readable medium of claim 12, wherein the team space is used to host at least one of a discussion or a document associated with the CRM object, the team space displays data that describes at least one of the context or the state information, and the team space provides access to collaboration data including at least one of an email, a calendar, a members list, or a task list.

24. The non-transitory computer-readable medium of claim 12, wherein the computer instructions are further configured to cause the one or more processors to:

present the user interface, wherein the user interface is configured to be presented on a display of the computer system, the user interface is configured to provide a user with access to the team space, the user interface is configured to allow the user to invite another user into the team space, the user interface allows communication between a first user and a second user in the team space, and the communication is initialized using the state information; and initialize the team space with the state information, wherein
the state information comprises a list of users authorized to access the team space, wherein
the team space is accessible by the CRM server and the collaboration server,
the team space is associated with a visual indication that provides a status of the team space, wherein the visual indication indicates that the team space related to the CRM object has not been updated in a designated period of time,
the team space provides a status of users in the list of users,
a user not in the list of users can be invited to the team space,
the document repository maintains one or more versions of the documents stored in the document repository, wherein the documents stored in the document repository can be checked in or checked out by the one or more users, and wherein one or more notifications relating to updates to the documents stored in the document repository are sent,
the one or more electronic communication channels include one or more of: email, chat, or instant messaging,
the discussion forum includes one or more discussions relating to one or more of the documents stored in the document repository,
the team space provides one or more of: a calendar or a task list,
the CRM site template is associated with the team space and defines one or more of a layout, a style sheet, or a web part associated with the CRM object, wherein the CRM site template provides a look and feel associated with the CRM server,
the association between the business activity and the team space is provided by the web service integrating the CRM server and the collaboration server,
the business activity is a CRM activity, the context is a CRM context, and the CRM activity is one or more of: a customer account, a sales opportunity, a service request, a marketing plan, or a case management plan for a case,
the collaboration server is configured to provide a plurality of collaboration services,
the team space is configured to provide collaborative access to at least one collaboration service of the plurality of collaboration services,
the web service integrating the CRM server and the collaboration server is configured to modify an operation of at least one CRM server web service of the CRM server,
the web service integrating the CRM server and the collaboration server is configured to facilitate integration of the state information into the team space upon creation of the team space,
the CRM object is configured to be accessed via a CRM object user interface,
the collaboration server web service provides a collaboration server user interface through which a user can access the team space,
the collaboration server user interface and the CRM object user interface are independently accessible from one another, and
the collaboration server user interface is configured to display information regarding the CRM object.

25. A computer system comprising:
one or more processors;
a non-transitory computer-readable storage medium, coupled to the one or more processors; and
a plurality of instructions, encoded in the non-transitory computer-readable storage medium and configured to implement a customer relationship management (CRM) server by virtue of being configured to cause the one or more processors to
create a plurality of CRM objects, wherein
the plurality of CRM objects is created by the CRM server, and
each of the CRM objects represents a business activity of a plurality of business activities,
manage the plurality of CRM objects, wherein
the instructions configured to manage the plurality of CRM objects further comprise instructions configured to
provide access to a CRM object of the plurality of CRM objects,
send a request to create a team space for managing and capturing collaborative activity associated with the CRM object in a context of the business activity, wherein
the request is sent to a collaboration server using a web service integrating the CRM server and the collaboration server,
a team space identifier is created in the context as a result of being associated with the CRM object,
the team space for the CRM object is created and provided by the collaboration server, wherein the collaboration server generates a team space identifier that identifies the team space, wherein the team space identifier incorporates a CRM identifier that identifies a record created in a database for the CRM object, and wherein the CRM identifier is generated by the CRM server for the CRM object,
the team space is accessible by a user interface associated with the CRM server, a view of the team space rendered in the user interface by the collaboration server according to a CRM site template stored in a database associated with the collaboration server,
the instructions configured to create the team space further comprise instructions configured to obtain state information from the CRM object,
the state information is used in creating the team space, and
the team space provides a list of users associated with the team space, one or more electronic communication channels between users in the list of users, a document repository for storing documents created by one or more users in the list of users, and a discussion forum including items created by the one or more users in the list of users,
enable a security check to be performed to verify user authorization for accessing the team space, the enabling comprising:
determining that the user is not included in a first list of users authorized to access the CRM object at the CRM server;
determining that the user is included in a second list of users authorized to access the team space at the collaboration server;

receive a request to access the team space from the collaboration server, the team space being associated with the CRM object at the CRM server; and request the team space from the collaboration server using the CRM identifier, the view of the team space being provided to the CRM server by the collaboration server, wherein the team space displays data that describes at least one of the context or the state information corresponding to the CRM object.

26. The computer system of claim 25, wherein the computer system further comprises:

the collaboration server, wherein
  the collaboration server comprises
    a CRM integration web service, and
  the collaboration server is configured to provide a plurality of collaboration services.

27. The computer system of claim 26, wherein the CRM integration web service is configured to facilitate integration of the state information into the team space upon creation of the team space, and the CRM integration web service is configured to modify an operation of at least one CRM server web service of the CRM server.

* * * * *